United States Patent
Okada et al.

(10) Patent No.: US 6,907,415 B2
(45) Date of Patent: Jun. 14, 2005

(54) FINDING RULES AND EXCEPTIONS FROM DATABASES

(76) Inventors: Masao Okada, 5-2-18-101, Midori-cho, Koganei-shi, Tokyo (JP); Yongmei Liu, Okumura-sou 203, 2-1-14, Maehara-higashi, Funabashi-shi, Chiba-ken (JP)

( * ) Notice: Subject to any disclaimer, the term of this patent is extended or adjusted under 35 U.S.C. 154(b) by 808 days.

(21) Appl. No.: 09/855,911

(22) Filed: May 15, 2001

(65) Prior Publication Data
US 2004/0015466 A1 Jan. 22, 2004

(51) Int. Cl.$^7$ .............................................. G06F 17/00
(52) U.S. Cl. ...................................................... 706/47
(58) Field of Search ........................................... 706/47

(56) References Cited
U.S. PATENT DOCUMENTS
6,345,239 B1 * 2/2002 Bowman-Amuah ............ 703/6

OTHER PUBLICATIONS
Rubin et al, "Generalization of Attribute Before Mining to Enable Rule Discovery", IEEE Fuzzy Information Processing Society, Jul. 2000.*

* cited by examiner

Primary Examiner—George Davis
(74) Attorney, Agent, or Firm—Kenneth Watov; Watov & Kipnes, P.C.

(57) ABSTRACT

A method for finding rules and exceptions from a database uses four stages programmed into a computer, wherein the four stages include an adaptive stage for creating in accordance with a user's previously inputted specifications, a parameter file of rules and exceptions finding conditions in accordance with the user's specifications, with the file being displayed to the user; a data model stage for analyzing the parameters from the parameter file, and retrieving data from one or more databases in accordance with the parameters; a problem formulator stage for transforming the retrieved data into a formalized data structure compatible with the parameters, and creating a catalog of possible attributes; and a solving stage for generating rules and exceptions from the formalized data by using the parameters and the catalog, and sending the result to the adaptive stage.

9 Claims, 6 Drawing Sheets

FINDING RULES AND EXCEPTIONS FROM DATABASES

FIELD OF THE INVENTION

This invention is related with data processing, especially related with data mining processing for mining rules from database.

BACKGROUND OF THE INVENTION

1. Knowledge Discovery and Data Mining (KDD)

Databases today can range in size into the terabytes of data and soon the pentabytes arena. Within these masses of data lies hidden information of strategic importance. Data Mining is the powerful new technology following OLAP tools with great potential to help companies focus on the most important information in database and data warehouse.

Innovative organizations are already using data mining to locate and appeal to higher-value customers, reconfigure their product offerings to increase sales, and minimize losses due to error or fraud.

GST-DSS (General System Theory Based Decision Support System) has automatic Data Mining and Knowledge Discovery(KDD) tool based on rule induction mechanism by extended Prolog(ext-Prolog) engine. KDD tool can be applied directly to major operational database and data warehouse by built-in DBMS interface. Users can understand the data by expressed rule database and find predictive information even experts may miss.

2. Automatic Discovery System

GST-DSS has built-in KDD component based on rule induction by ext-Prolog engine. Logical rules in database are usually explored and expressed as conditional or affinity relationships.

Logical rule has the following form:

```
IF
    Sex = Male
AND
    Item = Diaper
THEN
    Item = Beer
    (Confidence = 80%)
    (Support = 25%)
```

Here logical conditions (IF Sex=Male AND Item=Diaper) and associations (THEN Item=Beer) are combined where confidence factor of 80%(Confidence) and coverage of 25% to the entire records(Support). This form of hybrid structure delivers the same notation with Prolog logic rules.

The rules have the advantage of being able to deal with numeric and character data in a uniform manner. When dealing with numeric data, prior approaches have to break numeric fields into "codes" or specific category values. Also, rules may easily go beyond attribute-value representations such as "Import_Country=Export_Country". Here, we compare the values of two columns, without explicitly naming any values. This relationship cannot be stated by decision trees or cross-tabs approach. This rule induction can discover general rules and can be easily understood by business users.

SUMMARY OF THE INVENTION

As described above, KDD tools can find rules. But as we think an exception also contains important information, our system tries to find not only general rules but also exception rules. As the concept of an exception is not so popular, in this specification it is defined as follows:

"If A then B" is an exception when the next three conditions are all satisfied.

(1) There exists C such as "If A then C" is one of the rules.

(2) The confidence factor of "If A then B" is greater than zero.

(3) The confidence factor of "If A then B" is equal to or less than the value specified by the user (ExceptionFactor parameter).

An object of the present invention is directed to a method for utilizing on-line mining to generating inference rules and exceptions from large databases.

The method adopts a skeleton approach based on the GSM (goal seeking model) of MGST (Mathematical General System Theory) for system construction. Following the MGST approach, the present invention is achieved in four stages, adaptive (adp) stage, data model (dm) stage, problem formulate (prf) stage, and solver (slv) stage.

The adp(adaptor) stage corresponds to adaptive layer in MGST approach, and it receives the specifications from an online user and generates a parameter file which can be considered as a threshold of the rule generation process, then gets the result from the slv stage and displays the rules and exceptions, which generated from the slv stage, to the user. The user can adjust the specifications to get more satisfaction result.

The dm stage, prf stage and slv stage correspond to the problem solving layer in MGST approach.

The dm(data model) stage analyzes the user's order from the parameter file which has been generated at the first stage; then gets the necessary data from a database system. The result of this stage is necessary data and analyzed parameters such as minimum support number, minimum confidence number, maximum exception number and data structure parameters.

The prf stage transforms the supplied data into a data structure suitable for slv based on parameters analyzed in dm. Also, in the prf stage, it gives the catalogs of combination of attributes.

The slv stage gets the formulized data, attributes combination catalogs and other data mining parameters from the prf stage as input, the main task of the slv stage is to find the rules and exceptions from the formulized data and save the result in a file (Analize.dat).

All of the first three stages can be considered as the preprocessing stages, the main algorithm for data mining is defined in the slv stage. The slv stage further includes three sub-stages, getsupport substage, getrule substage and getresult substage.

They are defined as follows; the getsupprot substage is used to compute the support number of each attribute combinations. In this substage, the bitmap method is used to speed up the execution. In order to get exceptions, each support number should be computed. The getrule substage is to get the confidence for each attribute combination which includes the output attribute (if the output is suggested), then find the rules with the condition of the support number is not smaller than the minimum support number, and at the same time, the confidence is not smaller than the minimum confidence number. Then the exceptions are computed according to the existing rules and the maximum exception number. The getresult substage is to save the rules and exceptions into a text file "Analize.dat" in some medium such as hard disk, CD and etc. The "Analize.dat" was then sent to the adp stage as the solution to be shown for the user.

DESCRIPTION OF THE PREFERRED EMBODIMENTS

Figure 1:
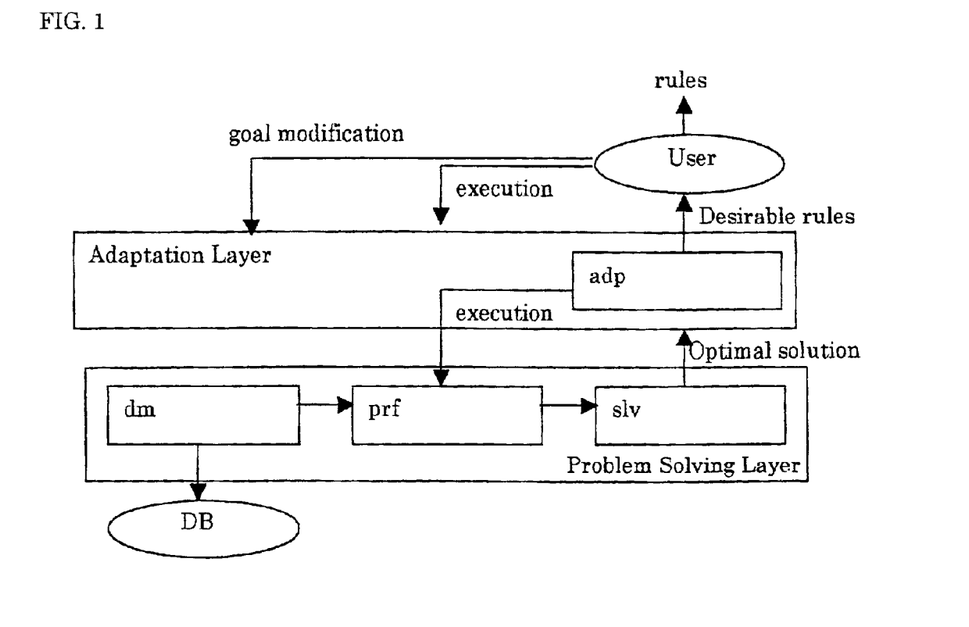
FIG. 1 shows a flowchart example of the skeleton for finding rules and exceptions adopted by the invention.

FIG. 1 depicts the problem solving skeleton adopted by the invention. The problem solving skeleton for computer executing data mining consists of two layers, PSL (problem solving layer) and ADPL (adaptation layer). The component of adaptation layer is adp(adaptor). The problem solving layer is composed of three components, dm(data model), prf(problem formulator) and slv(solver). dm provides necessary data from specified database for problem solving. prf transforms the supplied data into a data structure suitable for slv. slv is a process of problem solving algorithm. If a solution generated by slv, it does not satisfy the criterion of adp, it tries to improve the behavior of the problem solving layer by modifying dm.

Figure 2:
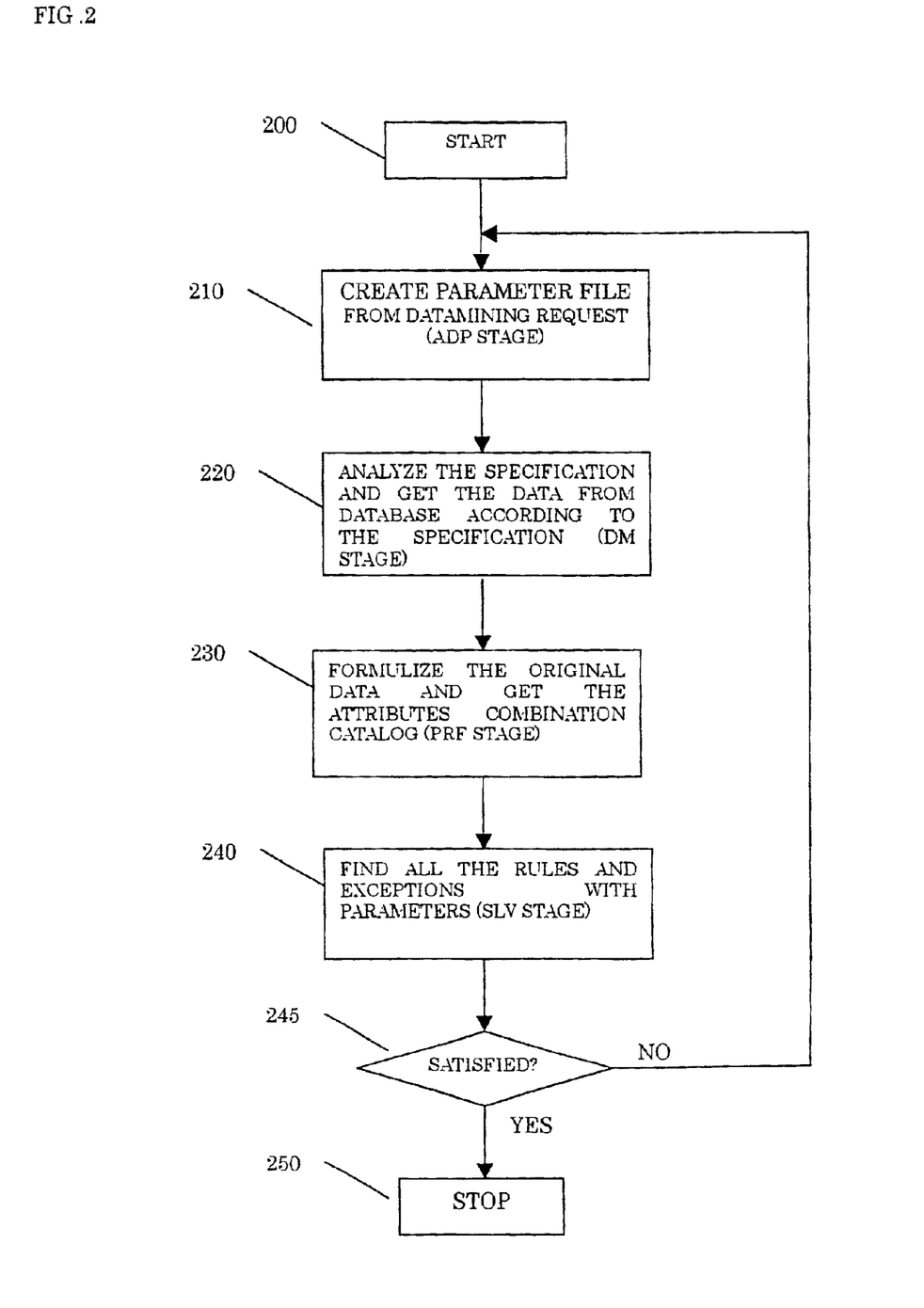
FIG. 2 shows an example of a flowchart of the method for finding rules and exceptions performed by one embodiment of the invention.

FIG. 2 depicts an example of a flowchart of a method having features of the present invention. Step 200 starts the data mining system. Step 210 defines the first stage, the adp stage of the present method. This stage is an interaction process between the user and the system. It is used to get the data mining request from the user. The request includes mining database name, table name, fields information, output fields information, minimum confidence, minimum support, and maximum exception.

Then a parameter file used by a mining system is created. The format of the parameter file is as follows:
DatabaseName=dbname
TableName=Tbname
Fields=Attributename1, type 1, class 1, value 11, value 12, ... value 1n,;Attributename2, type2, class 2, value 21, value 22, ... value 2n;
... Attibutenamem, typem, classm, valuem1, valuem2, ... valuemn
OutputFields=Attributename, type, class, value 1, value 2, ... valuen
ConfidenceFactor=Number(the minimum confidence number between 0~100)
SupportNumber=Number(the minimum support number from 0~)
ExceptionFactor=Number(the maximum exception value between 0~100)

In the Fields parameter, the TYPE is defined as C or N, where C represents Character and N represents Number. The Class is defined as C, D, W or V, where C: divide the sorted data into n parts, each part has almost same number of data (n is given as value); D: the distinct values, which are given after 'D'; W: divide the sorted data into n ascending intervals by using max and min (n, min, max is given as value), where each interval has almost same width; V: divide the data according to the user's order. Value: is given according to the class. Here is an example of the parameter file as follows:
DatabaseName=stock
TableName=dsjp 1
Fields=date,C,C,3;dow,C,V,[["Weekday", "2", "3", "4", "5", "6"],["Weekend", "7", "1"]]
OutputFields=dj_sp,N,W,3, 11.30,11.44
ConfidenceFactor=60
SupportNumber=2
ExceptionFactor=25

Step 220 defines the second stage, dm stage of the method. In this step, it first reads the information from the parameter file that was generated from step 210, then analyzes the specification, gets the data from database according to the specification. Step 230 defines the third stage, prf stage of the method where the original data from dm stage (step 220) are formulized in the way that they can be treated in the next stage, slv stage. In this step, the attributes combination catalog is also generated so that it can be used as one parameter in step 240.

Step 240 defines the fourth and final stage, slv stage of the method which has the algorithm to generate rules and exceptions from the formulized data, such that the rules satisfies the minimum support and minimum confidence and the exception satisfies the maximum exception. The step 245 is the step that when the user gets the result from the system, he can decide whether he wants to modify his request or he is satisfied with the result. If the result is satisfied, the process stops at step 250.

Figure 3:
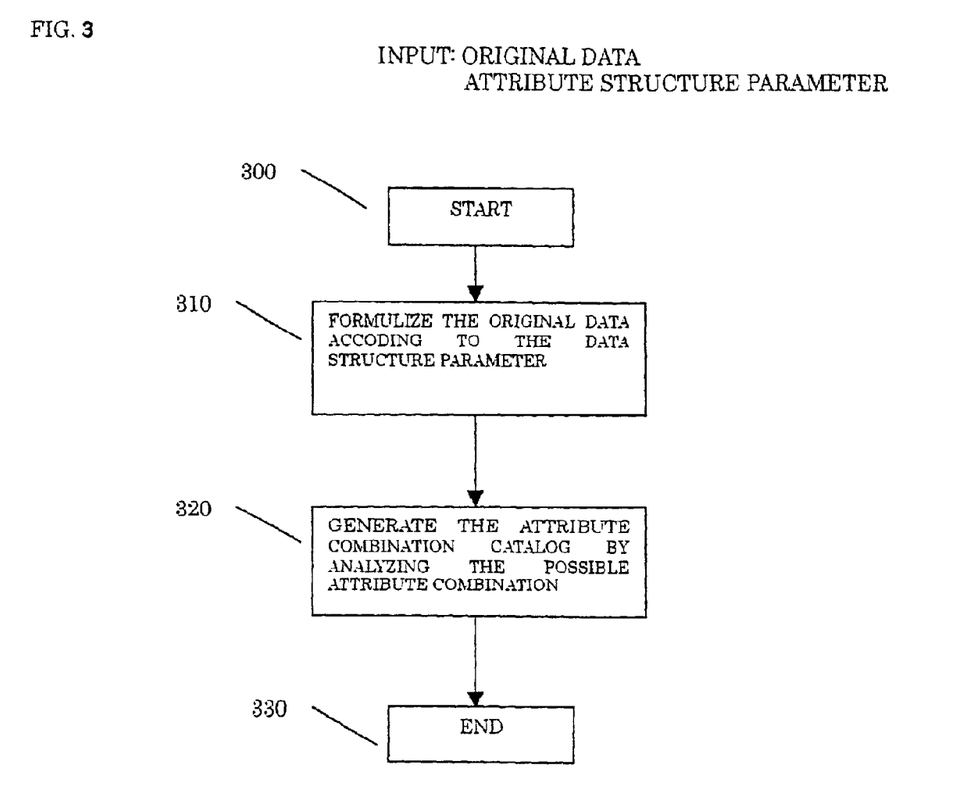
FIG. 3 shows an example of a flowchart for a detailed explanation of the prf stage, and can be considered as an expansion of step 230 of FIG. 2.

FIG. 3 depicts an example of a flowchart of prf stage of the present method where the original data is formulized by using the given attribute structure parameters, and generates the attribute combination catalog. Step 300 gets two inputs from dm stage. Step 310 formulized the data. For example if we have the following original data,
19280103 3 11.44
19280104 4 11.41
19280105 5 11.37
19280106 6 11.40
19280107 7 11.42
19280109 2 11.40
19280110 3 11.37
19280111 4 11.37
19280112 5 11.35
19280113 6 11.34
19280114 7 11.35
19280116 2 11.30
By using the given parameter file as the example shows, the formulized data will become:
D1 Weekday N3
D1 Weekday N3
D1 Weekday N2
D1 Weekday N3
D2 Weekend N3
D2 Weekday N3
D2 Weekday N2
D2 Weekday N2
D3 Weekday N2
D3 Weekday N1
D3 Weekend N2
D3 Weekday N1

In this formulized data, D1 represents the date from 19280103 to 19280106, D2 represents the date from 19280107 to 19280111, D3 represents the date from 19280112 to 19280116. Weekday represents the dow from 2 to 6 and Weekend represents the dow of 7 and 1. N1 represents the dj_sp from 11.30 to 11.34, N2 represents dj_sp from 11.35 to 11.38, and N3 represents the dj_sp from 11.39 to 11.44.

Step 320 generates the attribute combination catalog, when the attribute combination catalog has been generated, the process stops at step 330. One example of the attribute combination is as follows:

[[date],[dow],[dj_sp],[date,dow],[data,dj_sp],[dow, dj_sp],[date,dow, dj_sp].

Figure 4:
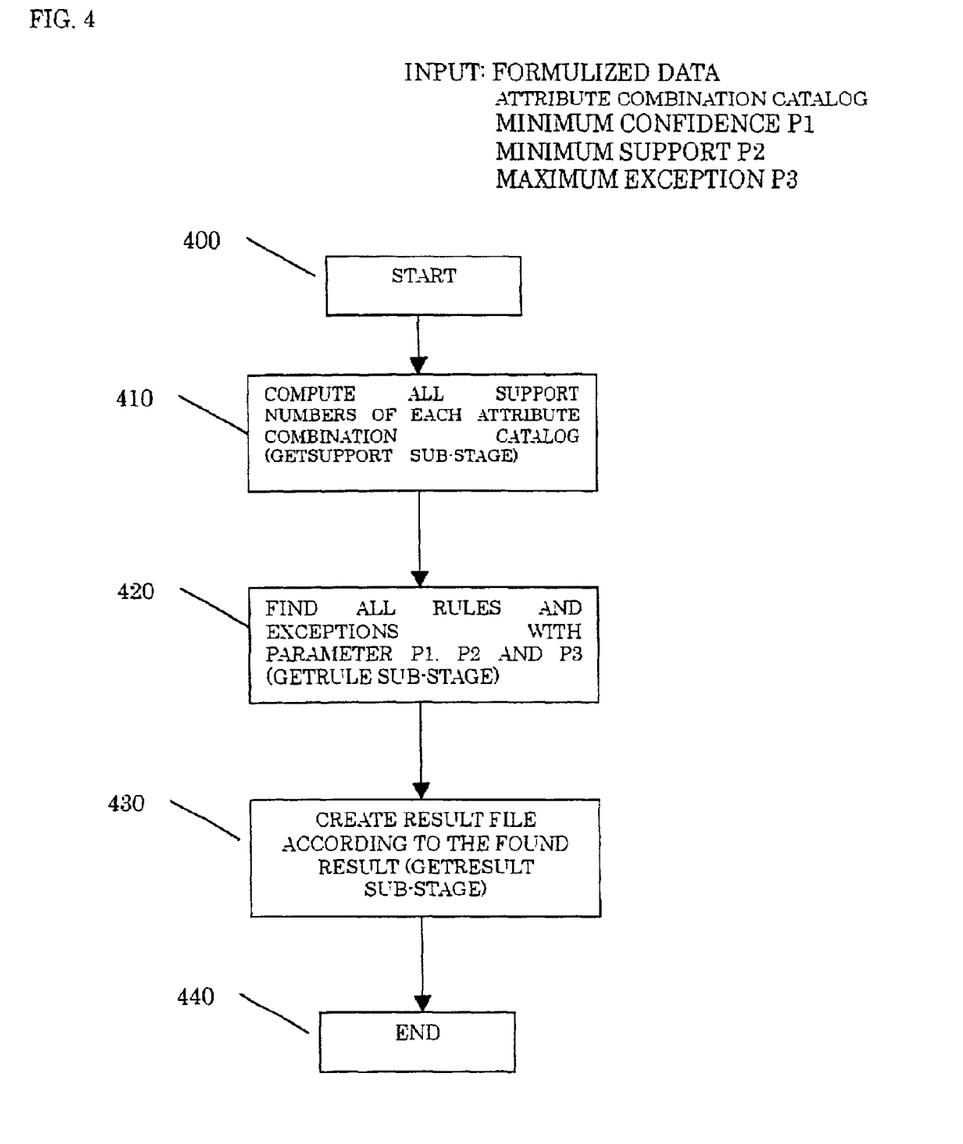
FIG. 4 shows an example of a flowchart for a detailed explanation of the slv stage, and can be considered as an expansion of step 240 of FIG. 2.

FIG. 4 depicts an example of a flowchart of slv stage of the present method where all the rules and exceptions are generated from the formulized data. Step 400 gets the input from the dm stage and the prf stage. The minimum confidence P1, minimum support P2 and maximum exception P3 are from the dm stage. The formulized data and the attribute combination catalog are from the prf stage. Step 410 corresponds to the getsupport sub-stage in the slv stage, it computes all support numbers of every value combination for each attribute combination. Step 420 corresponds to the getrule sub-stage, it is to find all rules and exceptions by using the parameter P1, P2, and P3. Step 430 corresponds to the getresult substage, it is to write the generated result into a result file so that the adp stage can get it. At step 440 the process stops.

Figure 5:
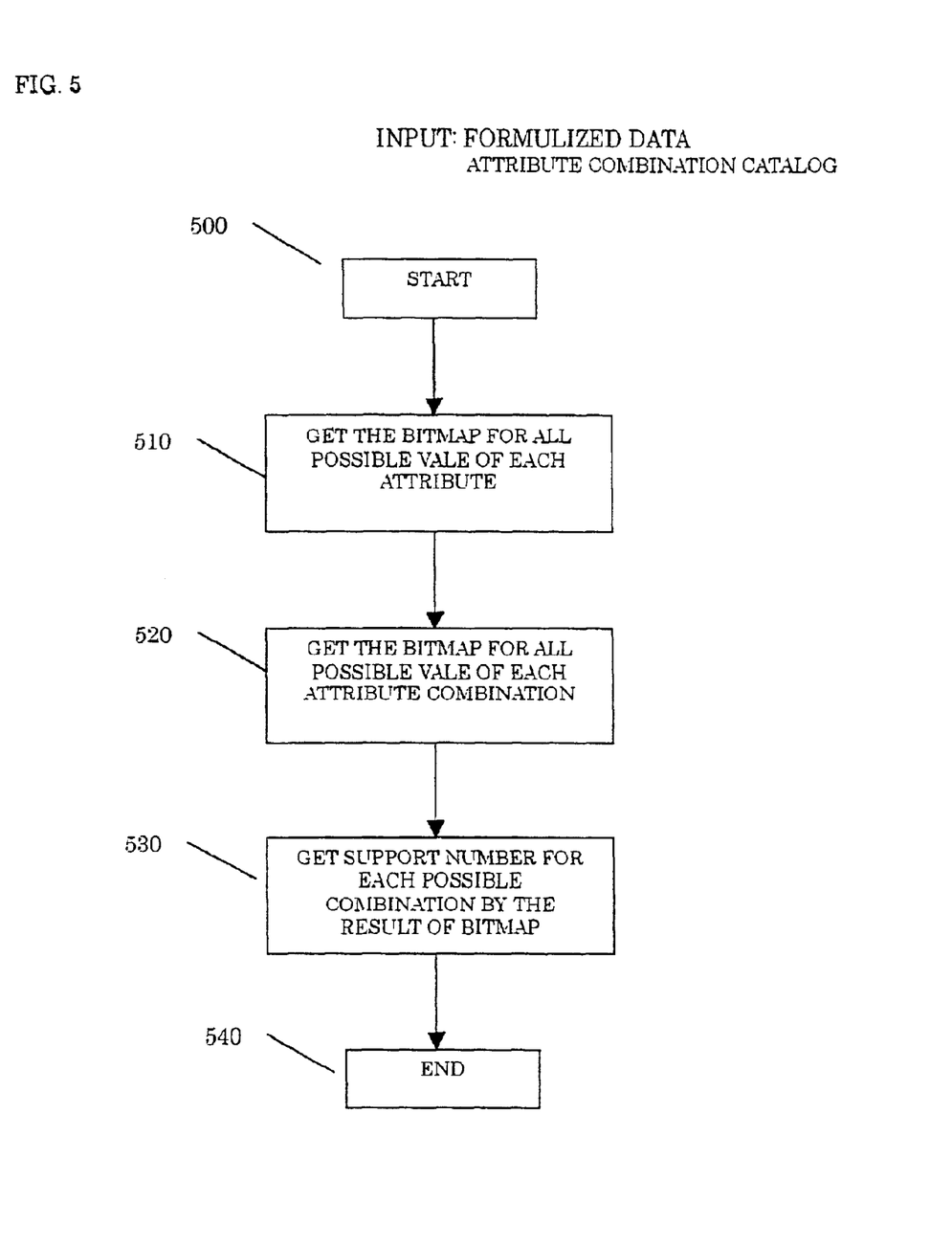
FIG. 5 shows an example of a flowchart for a detailed explanation of getsupport substage in the slv stage.

FIG. 5 depicts an example of a flowchart of the getsupport sub-stage of the present method where all of the support numbers is computed. Here in order to speed up the execution, we adopt the bitmap method.

Step 500 gets the formulized data and the attribute combination catalog from the prf stage. Step 510 gets the bitmap for all values of each attribute. The example of bitmaps for attribute date, dow and dj_sp are as follows:

dateD1=[1,1,1,1,0,0,0,0,0,0,0,0]
dateD2=[0,0,0,0,1,1,1,1,0,0,0,0]
dateD3=[0,0,0,0,0,0,0,0,1,1,1,1]
dowWeekday=[1,1,1,1,0,1,1,1,1,1,0,1]
dowWeekend=[0,0,0,0,1,0,0,0,0,0,1,0]
dj_spN1=[0,0,0,0,0,0,0,0,0,1,0,1]
dj_spN2=[0,0,1,0,0,0,1,1,1,0,1,0]
dj_spN3=[1,1,0,1,1,1,0,0,0,0,0,0]

Step 520 is to get the bitmap for all value combination of each attribute combination. For example consider about the attribute combination of [date,dj_sp], we take the advantage of bitmap calculation, as follows:

dateD1' dj_spNi=[1,1,1,1,0,0,0,0,0,0,0,0]' [0,0,0,0,0,0,0,0, 0,1,0,1]=[0,0,0,0,0,0,0,0,0,0,0,0]
dateD2' dj_spN1=[0,0,0,0,1,1,1,1,0,0,0,0]' [0,0,0,0,0,0,0,0, 0,1,0,1]=[0,0,0,0,0,0,0,0,0,0,0,0]
dateD3' dj_spN1=[0,0,0,0,0,0,0,0,1,1,1,1]' [0,0,0,0,0,0,0,0, 0,1,0,1]=[0,0,0,0,0,0,0,0,0,1,0,1]
dateD1' dj_spN2=[1,1,1,1,0,0,0,0,0,0,0,0]' [0,0,1,0,0,0,1,1, 1,0,1,0]=[0,0,1,0,0,0,0,0,0,0,0,0]
dateD2' dj_spN2=[0,0,0,0,1,1,1,1,0,0,0,0]' [0,0,1,0,0,0,1,1, 1,0,1,0]=[0,0,0,0,0,0,1,1,0,0,0,0]
dateD3' dj_spN2=[0,0,0,0,0,0,0,0,1,1,1,1]' [0,0,1,0,0,0,1,1, 1,0,1,0]=[0,0,0,0,0,0,0,0,1,0,1,0]
dateD1' dj_spN3=[1,1,1,1,0,0,0,0,0,0,0,0]' [1,1,0,1,1,1,0,0, 0,0,0,0]=[1,1,0,1,0,0,0,0,0,0,0,0]
dateD2' dj_spN3=[0,0,0,0,1,1,1,1,0,0,0,0]' [1,1,0,1,1,1,0,0, 0,0,0,0]=[0,0,0,0,1,1,0,0,0,0,0,0]
dateD3' dj_spN3=[0,0,0,0,0,0,0,0,1,1,1,1]' [1,1,0,1,1,1,0,0, 0,0,0,0]=[0,0,0,0,0,0,0,0,0,0,0,0]

Step 530 is to get the support number for each possible combination by counting 1's of the bitmaps. Support numbers were obtained in this example as follows:

dateD1=4,
dateD2=4,
dateD3=4,
dowWeekday=10,
dowWeekend=2,
dj_spN1=2,
dj_spN2=5,
dj_spN3=5,
[dateD1,dj_spN1]=0,
[dateD2,dj_spN1]=0,
[dateD3,dj_spN1]=2,
[dateD1,dj_spN2]=1,
[dateD2,dj_spN2]=2,
[dateD3,dj_spN2]=2,
[dateD1,dj_spN3]=3,
[dateD2,dj_spN3]=2,
[dateD3,dj_spN3]=0

At step 540 the process stops.

Figure 6:
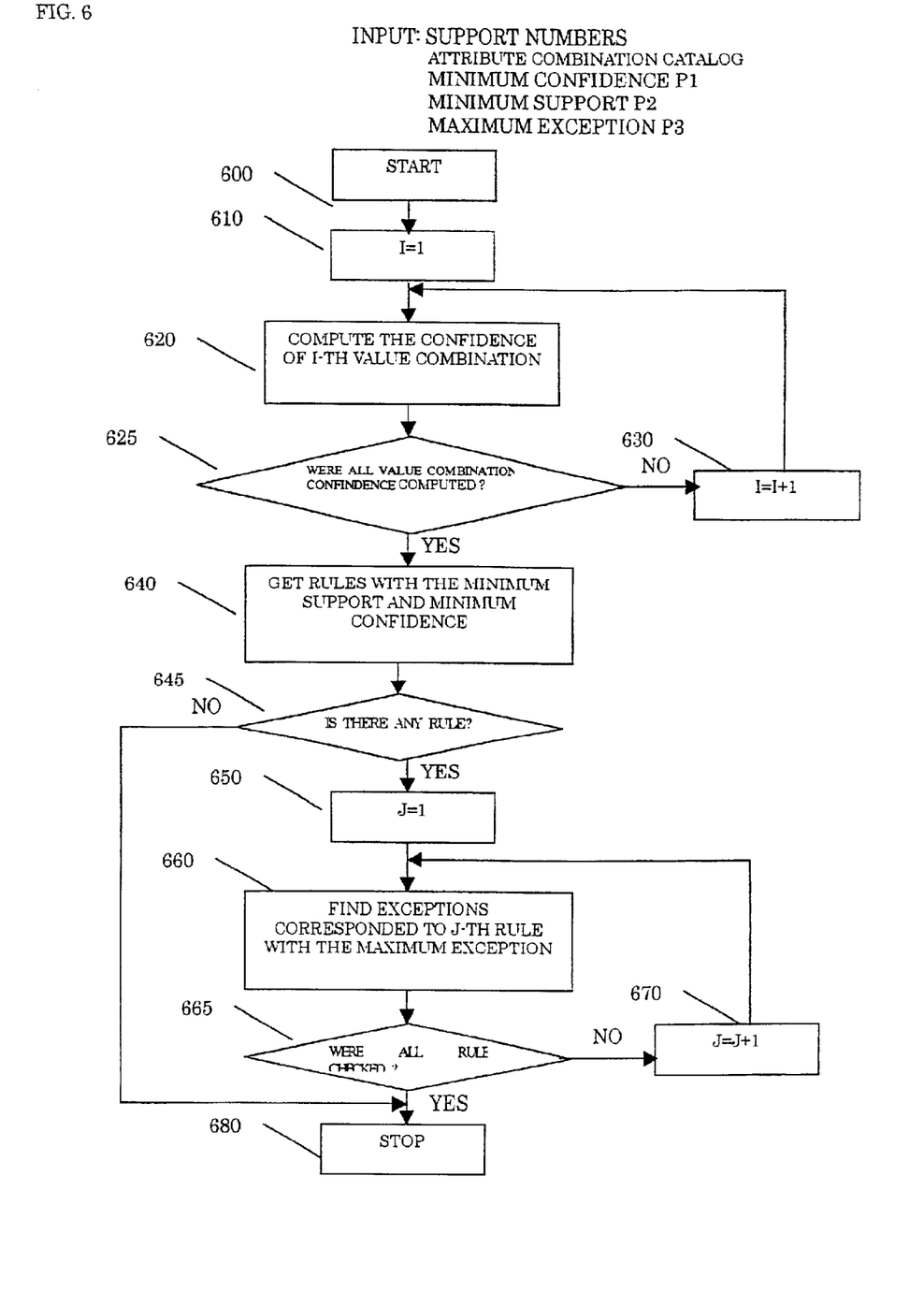
FIG. 6 shows an example of a flowchart for a detailed explanation of getrule sub-stage in the slv stage.

FIG. 6 depicts an example of a flowchart of getrule substage of the present method for generating the rules and exceptions from the support numbers computed by getsupport sub-stage in FIG. 5.

Step 600 is the entry to the algorithm. Four inputs are required, which are the support numbers and their corresponding value and attribute combinations; minimum support; minimum confidence; and maximum exceptions. First, we must compute the confidence of each value combination. Step 610 is to begin with the first value combination which(I=1, I is a sequential number) includes the output attribute (if the output is suggested). Step 620 is to compute the confidence of each value combination which includes the output attribute (when the output is suggested), for example the confidence of first value combination dj_spN1=support number/whole number=2/12=0.1667. Step 625 is to decide whether all value combination confidence has been computed or not. If the answer is no then the counter is incremented(I=I+1) and process steps 620–630 repeat.

If the answer of step 625 is yes then the step 640 gets all the rules with the minimum support and minimum confidence. In this example, P1=60(%), P2=2. Step 645 checks whether there are any rules generated. If rules have been generated, it tries to generate exceptions based on each rule. Step 650 is to begin with the first rule(J=1, J:). Step 660 is to check whether there exists an exception or not to the J-th rule. For example, the confidence of value combination [dateD1, djspN3]=support number/support number of dateD1=3/4=0.75, so the rule generating conditions P1 and P2 are satisfied, as one result of step 640, a rule: dataD1èdjspN3 has been generated. Then we want to find whether dataD1èdjspN1 or dataD1èdjspN2 is an exception or not.

In this example, the confidence of value combination [dateD1, dj_spN2]=support number/support number of dateD1=1/4=0.25, the confidence of value combination [dateD1, dj_spN1]=support number/support number of dateD1=0/4=0. Since in [dateD1, dj_spN2], both the confidence and support number are less then the minimum confidence value (P1=60) and minimum support number (P2=2), it is not a rule, and since its confidence value 0.25=25%, satisfy the maximum exception value, then [dateD1, dj_spN2] is an exception. With the same reason we can see that [dateD1,dj_spN1] is not a rule, and since the confidence of value combination [dateD1,dj_spN1]=0, it cannot be considered as an exception.

Step 665 then checks whether all rules exception-checking have been finished or not. If the answer is no, the counter is incremented (J=J+1), and the process steps 660–670 are repeated. If all the rules are checked, then the process stops at step 680.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. A method of finding rules and exceptions from a database is characterized by adopting four stages and their realization on computers, the four stages comprising:

an adaptive stage for creating a parameter file as the rules and exceptions finding conditions according to a receipted specification that is decided by a user, and displaying a result of generated rules and exceptions to the user;

a data model stage for analyzing a series of parameters from said parameter file and retrieving data from one or more databases according to the series of parameters;

a problem formulator stage for transforming said retrieved data into a formalized data structure suitable for said series of parameters, and creating a possible catalog of attributes; and a solving stage for generating rules and exceptions from said formalized data by using said series of parameters and said catalog, and sending the result of generated rules and exceptions to said adaptive stage.

2. The method of claim 1, wherein said solving stage further includes three sub-stages, comprising:

a getsupport sub-stage for computing a support number of each attribute combination from said attribute catalog;

a getrule sub-stage for determining a confidence value for the attribute combination based on said support number, and then finding the rules that can meet a condition restricted by said series of parameters, and then determining the exceptions according to said existing rules and a maximum exception number given by the parameter file; and a getresult sub-stage for saving said rules and exceptions that are generated in said getrule sub-stage into a text file.

3. The method of claim 2, wherein the getsupport sub-stage computes said support number by adopting a bitmap method which computes a bitmap value of said each attribute combination.

4. A program for the computer realization of a method to find rules and exceptions from a database characterized by adopting four stages, said four stages comprising:

an adaptive stage for both creating parameter file as the rules and exceptions finding conditions according to a receipted specification that is decided by a user, and displaying a result of generated rules and exceptions to the user;

a data model stage for both analyzing a series of parameters from said parameter file, and retrieving data from a database according to the series of parameters;

a problem formulator stage for both transforming the retrieved data into a formalized data structure suitable for the series of parameters, and creating a possible catalog of attributes; and a solving stage for both generating rules and exceptions from the formalized data by using the series of parameters and the catalog, and sending the result of generated rules and exceptions to the adaptive stage.

5. The program of claim 4, wherein said solving stage comprises three sub-stages including:

a getsupport sub-stage for computing a support number of each attribute combination from the attribute catalog;

a getrule sub-stage for both obtaining a confidence value for each attribute combination based on the support number, and finding the rules that can meet a condition restricted by the parameter file, and then obtaining the exceptions according to the existing rules and a maximum exception number given by the parameter file; and a getresult sub-stage for saving the rules and exceptions that are generated in getrule sub-stage into a text file.

6. The program of claim 5, wherein said getsupport stage computes the support number by adopting a bitmap method which computes a bitmap value of each attribute combination.

7. A computer readable recording medium which has recorded therein a program for the computer realization of a method used to find rules and exceptions from a database characterized by adopting four stages, the four stages comprising:

an adaptive stage for both creating a parameter file as the rules and exceptions finding conditions according to a receipted specification that is decided by a user, and displaying a result of generated rules and exceptions to the user;

a data model stage for both analyzing a series of parameters from said parameter file, and retrieving data from a database according to the series of parameters;

a problem formulator stage for both transforming the retrieved data into a formalized data structure suitable for the series of parameters, and creating a possible catalog of attributes; and a solving stage for both generating rules and exceptions from the formalized data by using the series of parameters and the catalog, and sending the result of generated rules and exceptions to the adaptive stage.

8. The recording medium of claim 7 further including recorded therein a program for three sub-stages of said solving stage, the three sub-stages including:

a getsupport sub-stage for computing a support number of each attribute combination from the attribute catalog;

a getrule sub-stage for obtaining a confidence value for each attribute combination based on the support number, and then finding the rules that can meet a condition restricted by the parameter file, and then obtaining the exceptions according to the existing rules and a maximum exception number given by the parameter file; and a getresult sub-stage for saving the rules and exceptions that are generated in getrule sub-stage into a text file.

9. The recording medium of claim 8 further including recorded therein, a program for said getsupport sub-stage for computing the support number by adopting a bitmap method to compute a bitmap value of each attribute combination.

* * * * *